United States Patent
Kakemizu et al.

(10) Patent No.: US 10,163,240 B2
(45) Date of Patent: Dec. 25, 2018

(54) MICROSCOPE AND IMAGE PASTING METHOD

(71) Applicant: OLYMPUS CORPORATION, Hachioji-shi, Tokyo (JP)

(72) Inventors: Takahiko Kakemizu, Tokyo (JP); Shodai Hosono, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 90 days.

(21) Appl. No.: 15/352,695

(22) Filed: Nov. 16, 2016

(65) Prior Publication Data

US 2017/0161930 A1 Jun. 8, 2017

(30) Foreign Application Priority Data

Dec. 4, 2015 (JP) .................. 2015-237840

(51) Int. Cl.
| | |
|---|---|
| *G06T 11/60* | (2006.01) |
| *G02B 5/08* | (2006.01) |
| *G02B 21/02* | (2006.01) |
| *G02B 21/08* | (2006.01) |
| *G02B 21/24* | (2006.01) |

(Continued)

(52) U.S. Cl.
CPC .............. *G06T 11/60* (2013.01); *G02B 5/08* (2013.01); *G02B 21/02* (2013.01); *G02B 21/082* (2013.01); *G02B 21/248* (2013.01); *G02B 21/26* (2013.01); *G02B 21/367* (2013.01); *G02B 21/368* (2013.01); *G06T 5/001* (2013.01); *H04N 5/265* (2013.01); *H04N 7/183* (2013.01); *G06T 2207/10056* (2013.01); *G06T 2207/20221* (2013.01)

(58) Field of Classification Search
CPC ....................................................... G06T 11/60
See application file for complete search history.

(56) References Cited

U.S. PATENT DOCUMENTS 5,990,901 A * 11/1999 Lawton .................. G06T 15/503
345/581
8,451,335 B2 5/2013 Kang
(Continued)

FOREIGN PATENT DOCUMENTS

JP 2010141699 A 6/2010

*Primary Examiner* — James M Pontius
(74) *Attorney, Agent, or Firm* — Holtz, Holtz & Volek PC

(57) ABSTRACT

A microscope includes a driving controller, a position detector, an image capturing device, an image generator, a first correction amount detector, a second correction amount detector, and a decision device for correction amount. The driving controller changes an image pickup area of a sample. The position detector detects position information of the driving controller. The image capturing device captures frame images in the image pickup area. The first and second correction amount detectors respectively detect first and second correction amounts from the frame images. The decision device for correction amount compares a prescribed value and the first correction amount, and thereby selects one of the first correction amount and the second correction amount. The image generator pastes the frame images together on the basis of the first or second correction amount selected by the decision device for correction amount, and thereby assembles a pasted-together image.

11 Claims, 12 Drawing Sheets

(51) Int. Cl.
*G02B 21/26* (2006.01)
*G02B 21/36* (2006.01)
*G06T 5/00* (2006.01)
*H04N 5/265* (2006.01)
*H04N 7/18* (2006.01)

(56) References Cited

U.S. PATENT DOCUMENTS

| | | | | |
|---|---|---|---|---|
| 2009/0202137 | A1* | 8/2009 | Shinoda | G06T 11/60 |
| | | | | 382/145 |
| 2009/0324098 | A1* | 12/2009 | Nilsson | H04N 1/00307 |
| | | | | 382/209 |
| 2012/0050727 | A1* | 3/2012 | Yamamoto | G01J 3/0208 |
| | | | | 356/218 |
| 2012/0092482 | A1* | 4/2012 | Shinoda | H04N 5/23238 |
| | | | | 348/80 |
| 2017/0330019 | A1* | 11/2017 | Nakatsuka | G06T 7/248 |
| 2017/0336617 | A1* | 11/2017 | Nakatsuka | H04N 9/646 |

* cited by examiner

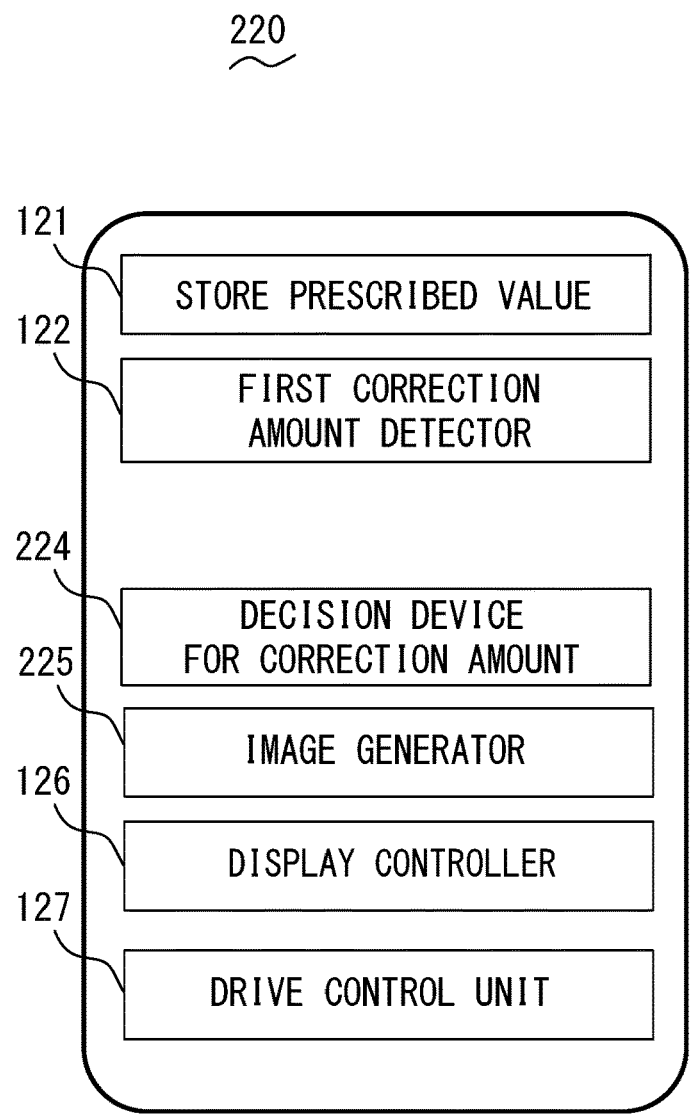
F I G. 6

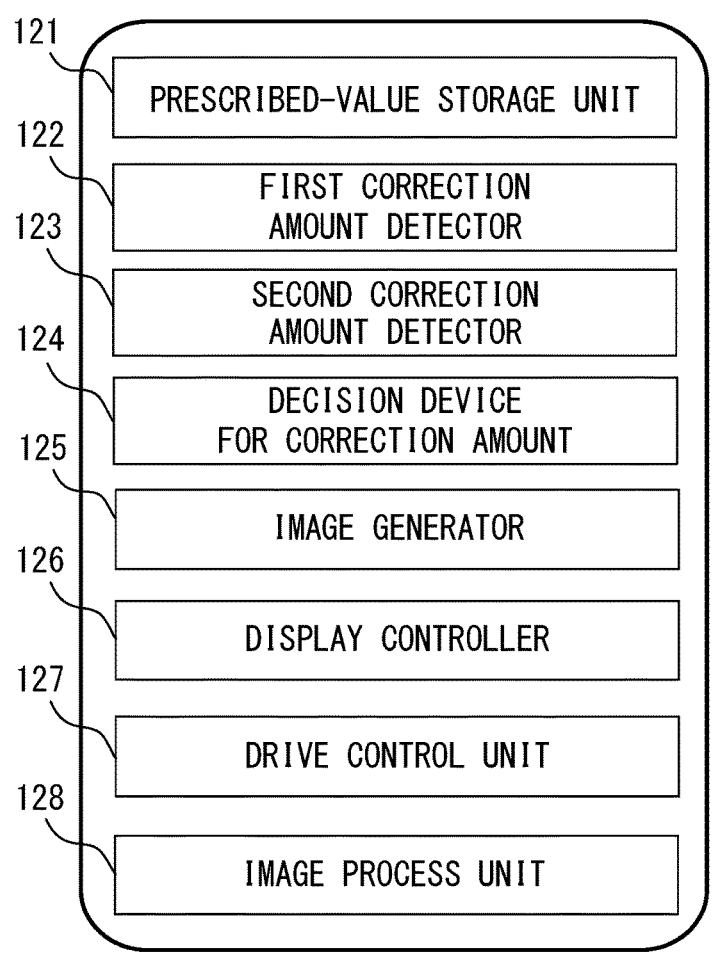
F I G. 9

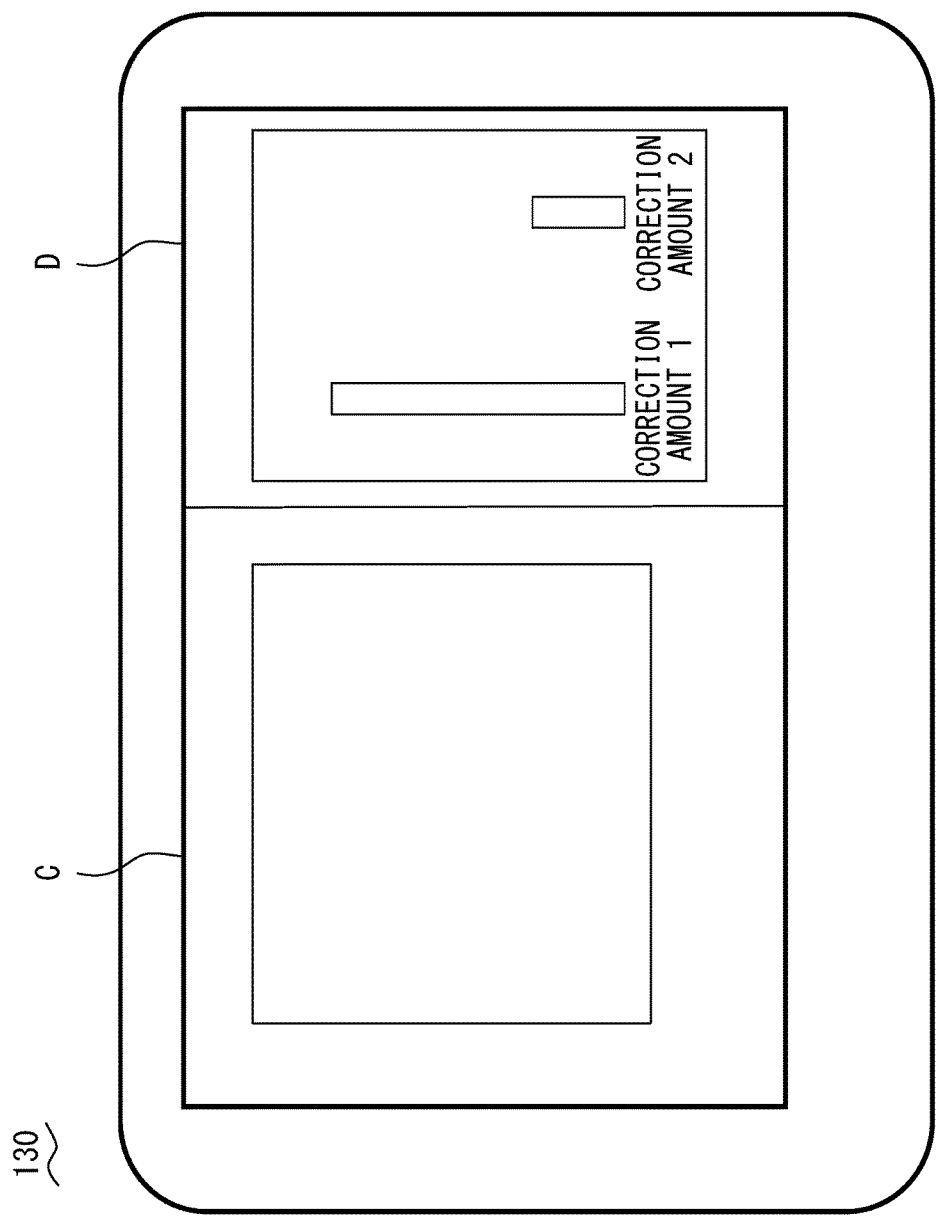

MICROSCOPE AND IMAGE PASTING METHOD

CROSS REFERENCE TO RELATED APPLICATIONS

This application is based upon and claims the benefit of priority from prior Japanese Patent Application No. 2015-237840, filed Dec. 4, 2015, the entire contents of which are incorporated herein by this reference.

BACKGROUND OF THE INVENTION

Field of the Invention

The present invention is related to the field of microscopes that have an image pasting function.

Description of the Related Art

A technique has conventionally been known in which a plurality of frame images captured in different image pickup areas are pasted together so as to generate one large pasted-together image.

For example, an image-pasting technique is known in which frame images are captured at respective positions while moving an electrically-powered stage that carries a sample for prescribed distances so as to paste the frame images together on the basis of the position coordinates specified for the electrically-powered stage when the electrically-powered stage is moved. However, the above technique based on specified position coordinates is not free from an error between the actual position coordinates of the electrically-powered stage after moving and the position coordinates specified for the electrically-powered stage, resulting in positional shifts when images are pasted together. That leads to accumulation of positional shifts for each pasting caused by errors between the actual position coordinates of the electrically-powered stage after moving and the specified position coordinates, which is problematic.

As a different image-pasting technique that can solve the above problem, a technique is known that uses a matching method in which a characteristic point is detected from an overlapping portion between adjacent frame images so as to paste images together on the basis of the characteristic point. (Japanese Laid-Open Patent Publication No. 2010-141699 describes above technique.)

SUMMARY OF THE INVENTION

A microscope according to an aspect of the present invention is a microscope including: a driving controller that changes an image pickup area of a sample; a position detector that detects position information of the driving controller; an image capturing device that captures frame images in the image pickup area; an image generator that pastes together the frame images captured by the image capturing device in the plurality of different image pickup areas, and thereby assembles a pasted-together image; a first correction amount detector that detects a first correction amount for pasting the frame images together from the frame images; a second correction amount detector that detects a second correction amount for pasting the frame images together, by using the position information corresponding to frame images; and a decision device for correction amount that compares a prescribed value that is set in advance and the first correction amount, and thereby selects one of the first correction amount and the second correction amount, wherein the image generator pastes the frame images together on the basis of the first correction amount or the second correction amount selected by the decision device for correction amount, and thereby assembles the pasted-together image.

A microscope according to another aspect of the present invention is a microscope including a driving controller that changes an image pickup area of a sample; a position detector that detects position information of the driving controller; an image capturing device that captures frame images in the image pickup area; an image generator that pastes together the frame images captured by the image capturing device in the plurality of different image pickup areas, and thereby assembles a pasted-together image; a first correction amount detector that detects a first correction amount for pasting the frame images together from the frame images; and a decision device for correction amount that compares a prescribed value that is set in advance and the first correction amount, and selects the first correction amount only when the first correction amount is equal to or smaller than the prescribed value, wherein the image generator pastes the frame images together on the basis of the first correction amount so as to assemble the pasted-together image when the first correction amount is selected by the decision device for correction amount, and pastes the frame images together without performing correction so as to assemble the pasted-together image when the first correction amount is not selected by the decision device for correction amount.

An image pasting method according to an aspect of the present invention is an image pasting method for a microscope that includes a driving controller, the image pasting method including: changing an image pickup area of a sample by a driving controller; detecting position information of the driving controller; capturing frame images in the image pickup area; and pasting together the frame images captured by the image capturing device in the plurality of different image pickup areas, and thereby assembling a pasted-together image, wherein a first correction amount for pasting the frame images together is detected from the frame images, a second correction amount for pasting the frame images together is detected by using the position information corresponding to frame images, one of the first correction amount and the second correction amount is selected by comparing a prescribed value that is set in advance and the first correction amount, and the frame images are pasted together on the basis of the selected first correction amount or the second correction amount, and the pasted-together image is assembled.

BRIEF DESCRIPTION OF THE DRAWINGS

The present invention will be more apparent from the following detailed description when the accompanying drawings are referenced.

FIG. 6 shows a functional configuration of a controller 220 according to a variation example of the first embodiment;

FIG. 9 shows a functional configuration of a controller 320 according to a third embodiment;

FIG. 12 shows an image display unit 130 in a state that it is displaying a ratio between the first and second correction amounts.

DESCRIPTION OF THE EMBODIMENTS

A matching method in which a characteristic point is detected from an overlapping portion of images so as to paste images together on the basis of the characteristic point sometimes fails to find a characteristic point in an overlapping portion of frame images and cannot paste images together. Also, false detection of a characteristic point leads to execution of pasting at a position that is far away from the inherent characteristic point.

In view of the above, the matching method has involved a problem that while success in pasting leads to a highly-accurate pasted-together image, a situation often occurs in which a desired pasted-together image is not obtained, deteriorating the reliability.

It is an object of the present embodiments to provide a microscope and an image-pasting method that can obtain a pasted-together image with high reliability.

Figure 1:
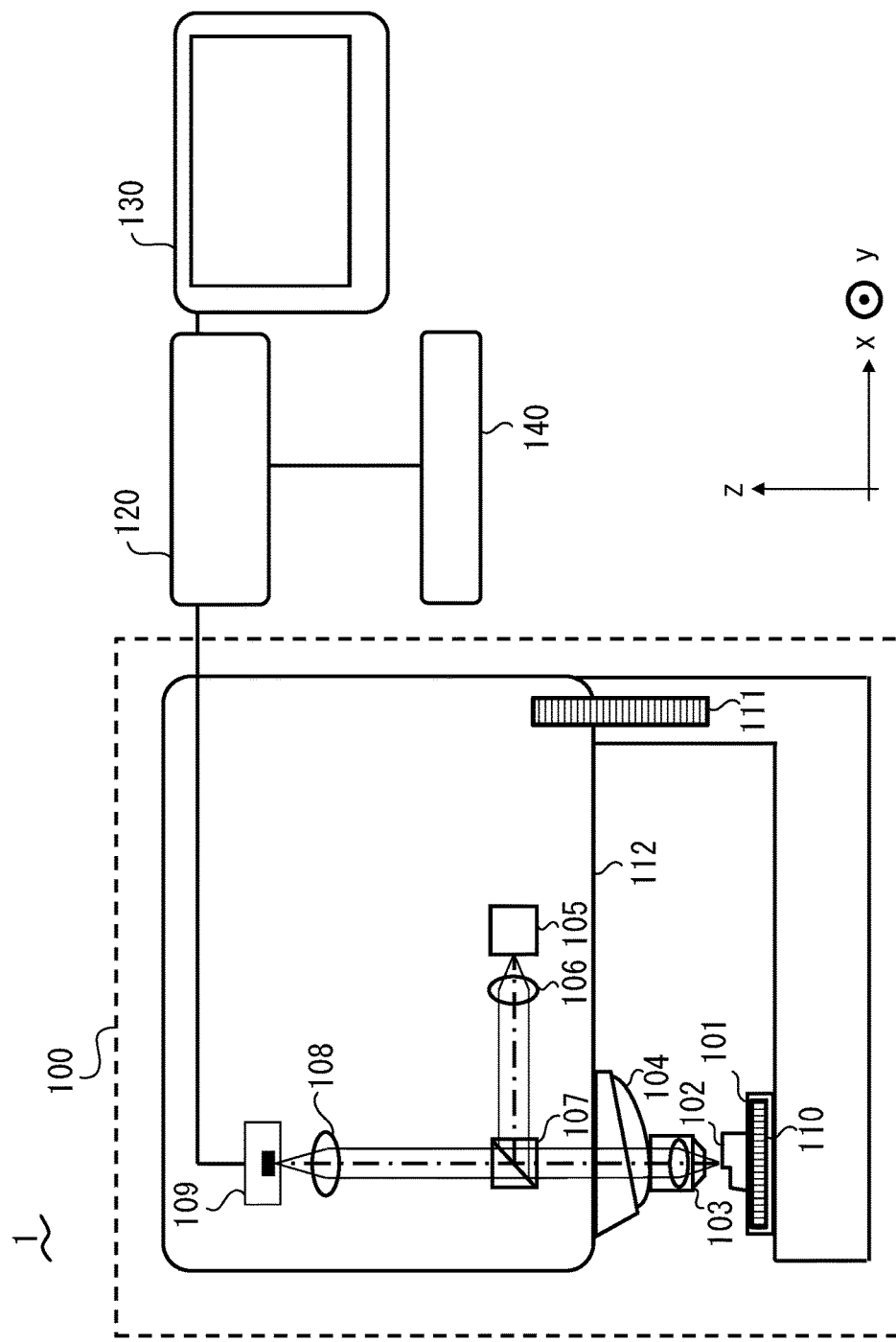
FIG. 1 is a configuration view of a microscope 1 according to a first embodiment.

Hereinafter, explanations will be given for the first embodiment of the present invention by referring to the drawings. FIG. 1 is a configuration view of a microscope 1 according to the present embodiment. The microscope 1 includes a microscope main body 100, a controller 120, an image display unit 130 and an input device 140 that are connected. The microscope main body 100 includes a stage 101 on which a sample 102 is set, an optical system that irradiates the sample 102 with light and a detection optical system that detects light (including reflected light and fluorescence) from the sample 102.

The microscope main body 100 includes, an optical system for irradiating the sample 102 with light, a light source 105 that issues laser light, a collimate lens 106, a half mirror 107, an objective lens 103 and a revolver 104 that fixes the plurality of objective lenses 103. The half mirror 107 may be replaced with a dichroic mirror etc. that distinguishes between laser light and light from the sample. When the objective lens 103 to be used is selected so as to be on the optical path by the revolution of the revolver 104, part of laser light issued from the light source 105 is reflected by the half mirror 107, and the sample 102 is irradiated with it.

In this example, the stage 101 and a head portion 112 of the microscope main body 100 can move under control of the controller 120. The stage 101 moves on the XY plane, in which the horizontal and depth directions in the figure are the X and Y axes, respectively, and the head portion 112 moves in the Z directions, which are the horizontal directions in the figure. An XY position detector 110 and a Z position detector 111 are for example scales, and respectively detect the position coordinates of the stage 101 and the head portion 112 as position information. The stage 101 and the sample 102 moving while irradiating the sample with laser light makes it possible to irradiate different image pickup areas on the surface of the sample 102 with the laser and to adjust the focus.

The microscope main body 100 further includes an imaging lens 108 and an image capturing device 109 as the detection optical system. The objective lens 103 and the half mirror 107 function also as the detection optical system, and part of light from the sample 102 after passing through the objective lens 103 is transmitted by the half mirror 107 and reaches the image capturing device 109. The image capturing device 109 is for example a camera. A frame image of an image pickup area is generated by taking in light formed by the imaging lens 108 so as to convert it into an electric signal and outputting it to the controller 120. At that moment, the frame image also contains position information detected by the XY position detector 110 and the Z position detector 111. Alternatively, the situation may also be one in which the position information detected by the XY position detector 110 and the Z position detector 111 is associated with a corresponding frame image.

Figure 2:
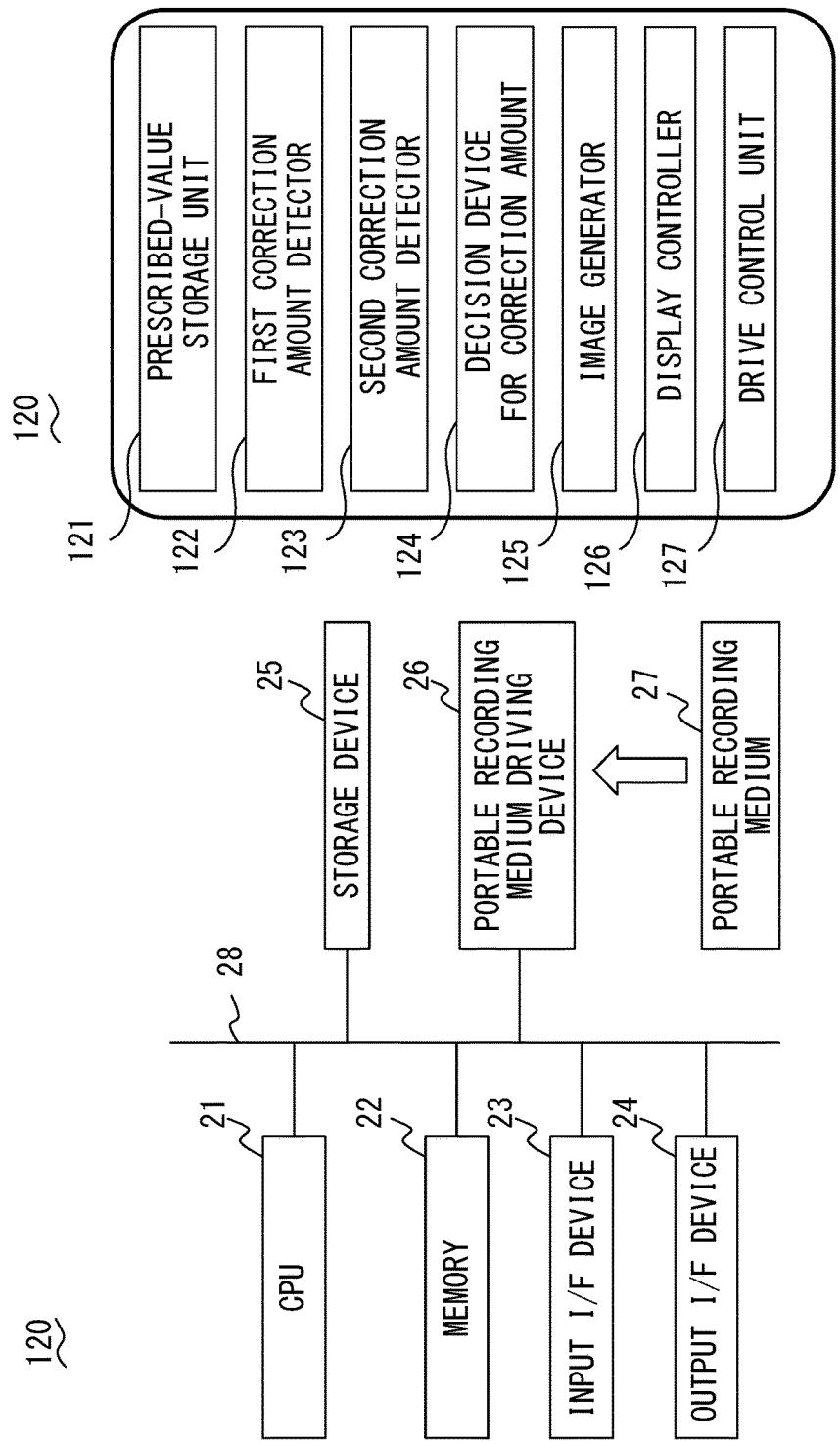
FIG. 2A shows a configuration of a controller 120 according to the first embodiment.
FIG. 2B shows a functional configuration of the controller 120 according to the first embodiment.

The controller 120 is a computer that performs various types of computation processes. For example, as shown in FIG. 2A, the controller 120 is provided with a CPU (central processing unit) 21, a memory 22, an input I/F device 23, an output I/F device 24, a storage device 25 and a portable recording medium driving device 26 to which a portable recording medium 27 is inserted, all of which are connected to each other via a bus 28. Note that FIG. 2A shows part of the configuration of the controller 120, and the controller 120 is not limited to this configuration.

The CPU 21 performs a computation process etc. by executing a prescribed program. The memory 22 is for example a RAM (random access memory), and temporarily stores, for execution of a program, a program or data that is stored in the storage device 25 or the portable recording medium 27.

The input I/F device 23 receives a signal from an input device 140, the image capturing device 109, the XY position detector 110 and the Z position detector 111. The output I/F device 24 outputs a signal to the image display unit 130, the stage 101 and the head portion 112.

The storage device 25 is for example a hard disk storage device, and is used mainly for storing various types of data and programs. The portable recording medium driving device 26 accommodates the portable recording medium 27 such as an optical disk, a CompactFlash (registered trademark), etc., and the portable recording medium 27 has a function of assisting the storage device 25.

By the CPU 21 loading a program stored in the storage device 25 or the portable recording medium 27 to the memory 22 so as to execute it, the controller 120 implements various functions. For example, the controller 120 functions as an image generator that generates a pasted-together image by pasting frame images together from different image pickup areas captured by the image capturing device 109. Also, the controller 120 functions as a display controller that displays the pasted-together image in the image display unit 130, which is a display medium.

FIG. 2B shows main functional constituents of the controller 120. The functional constituents are classified into a drive control unit 127 that controls moving of the stage 101 and the head portion 112, a prescribed-value storage unit 121, a first correction amount detector 122, a second correction amount detector 123, a decision device for correction amount 124, an image generator 125 and a display controller 126.

The drive control unit 127 specifies a instruction value that represents a movement amount up to the specified position coordinates when the stage 101 and the head portion 112 are moved. Note that specified position coordinates are position coordinates that specify an image pickup area in which the image capturing device 109 captures a frame image, and can be set by the user through the input device 140 a plurality of times. The stage 101 and the head portion 112 moves to the specified position coordinates on the basis of the instructed value. Also, while the stage 101 and the head portion 112 are set to move on the basis of the instruction value, they sometimes move to a position that is shifted from the specified position coordinates due to an error occurring when the devices move, temperatures, computation errors, etc. Hereinafter, the distance of a positional shift between the actual position coordinates after the stage 101 or the head portion 112 moved and the above position coordinates that are inherently specified will be referred to as a shift amount.

The first correction amount detector 122 and the second correction amount detector 123 are units that detect a correction amount when frame images in different image pickup areas captured by the image capturing device 109 are pasted together. A correction amount is a movement amount that is needed for correcting the positional shift from the specified position coordinates.

The first correction amount detector 122 is a unit that detects a correction amount when frame images indifferent image pickup areas captured by the image capturing device 109 are pasted together in a method that performs matching of a characteristic point, which will be described later. Hereinafter, a calculation value of a correction amount detected by the first correction amount detector 122 will be referred to as a first correction amount.

The second correction amount detector 123 is a unit that detects a correction amount when frame images in different image pickup areas captured by the image capturing device 109 are pasted together in a method different from the first correction amount detector, which will be described later. Hereinafter, a calculation value of a correction amount detected by the second correction amount detector 123 will be referred to as a second correction amount.

The prescribed-value storage unit 121 stores a prescribed value that is set in advance when a correction amount is determined. A prescribed value is a value set for securing the accuracy of correction, and is about a few μm.

A positional shift between specified position coordinates and the actual position coordinates is mainly based on the movement accuracy of the stage 101 and the head portion 112, and accordingly it is desirable that a prescribed value, which is a value that secures the accuracy of correction, be determined on the basis of the movement accuracy of the stage 101 and the head portion 112. Further, the prescribed value may be set on the basis of other elements such as temperatures, computation errors, etc. that cause the above positional shifts. Also, different prescribed values may be provided for the stage 101 and the head portion 112.

The decision device for correction amount 124 compares the first correction amount and the prescribed value so as to select one of the first and second correction amounts. More specifically, the decision device for correction amount 124 selects the first correction amount when the first correction amount is equal to or smaller than the prescribed value, and selects the second correction amount when the first correction amount is greater than the prescribed value.

On the basis of one of the first and second correction amounts selected by the decision device for correction amount 124, the image generator 125 pastes frame images together so as to assemble a pasted-together image.

By the display controller 126 outputting the pasted together image assembled by the image generator 125 to the image display unit 130, which is a display medium, the display controller 126 makes the image display unit 130 display the pasted-together image.

Explanations will be given for the method of pasting images together by using the microscope 1 having the above configuration and for a method of detecting the first and second correction amounts by referring to the drawings.

Figure 3:
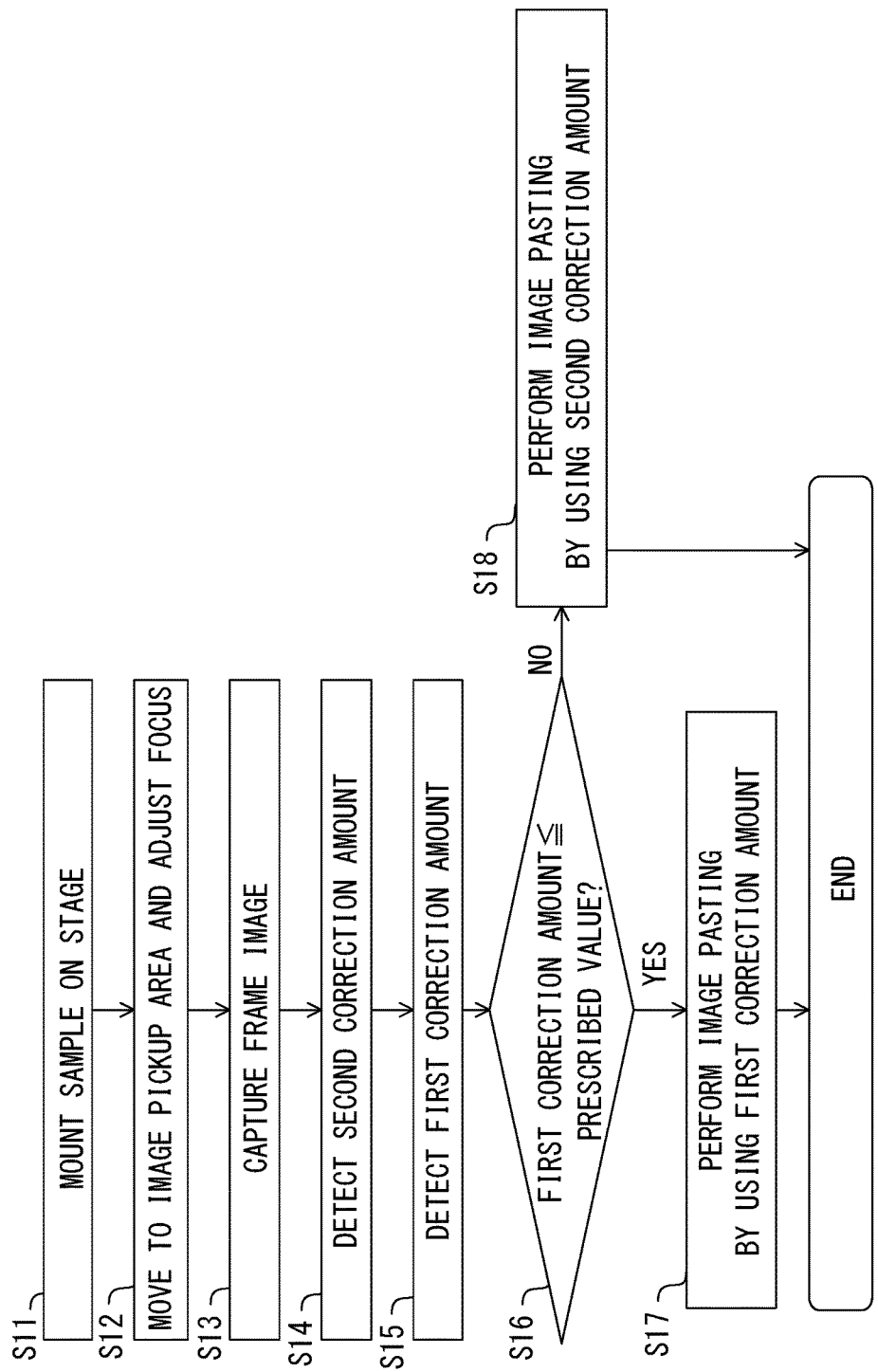
FIG. 3 is a flowchart explaining image pasting performed by using a microscope 1 according to the first embodiment.

FIG. 3 is, a flowchart explaining the frame image pasting procedures using the microscope 1 according to the present embodiment.

First, sample 102 is mounted on the stage 101 in step S11. The stage 101 moves on the basis of the instruction value specified by the drive control unit 127, and the head portion 112 adjusts the focus in the image pickup area (step S12). In step S13, the image capturing device 109 captures frame images. Note that in this example, a plurality of image pickup areas are specified so as to capture a plurality of frame images that are to be used for image pasting, step S12 and step S13 are repeated for each image pickup area, and frame images are captured for all the specified image pickup areas.

Next, in step S14, the second correction amount detector 123 detects a second correction amount. In the second correction amount detector 123, a distance between position coordinates detected by the XY position detector 110 and the Z position detector 111 and specified position coordinates in each frame image, the second correction amount is obtained. More specifically, the second correction amount detector 123 virtually arranges frame images on the basis of specified position coordinates corresponding to the respective frame images. The second correction amount detector 123 detects a distance between the position coordinates detected by the XY position detector 110 and the Z position detector 111 and specified position coordinates, and thereby obtains the second correction amount.

Figure 4:
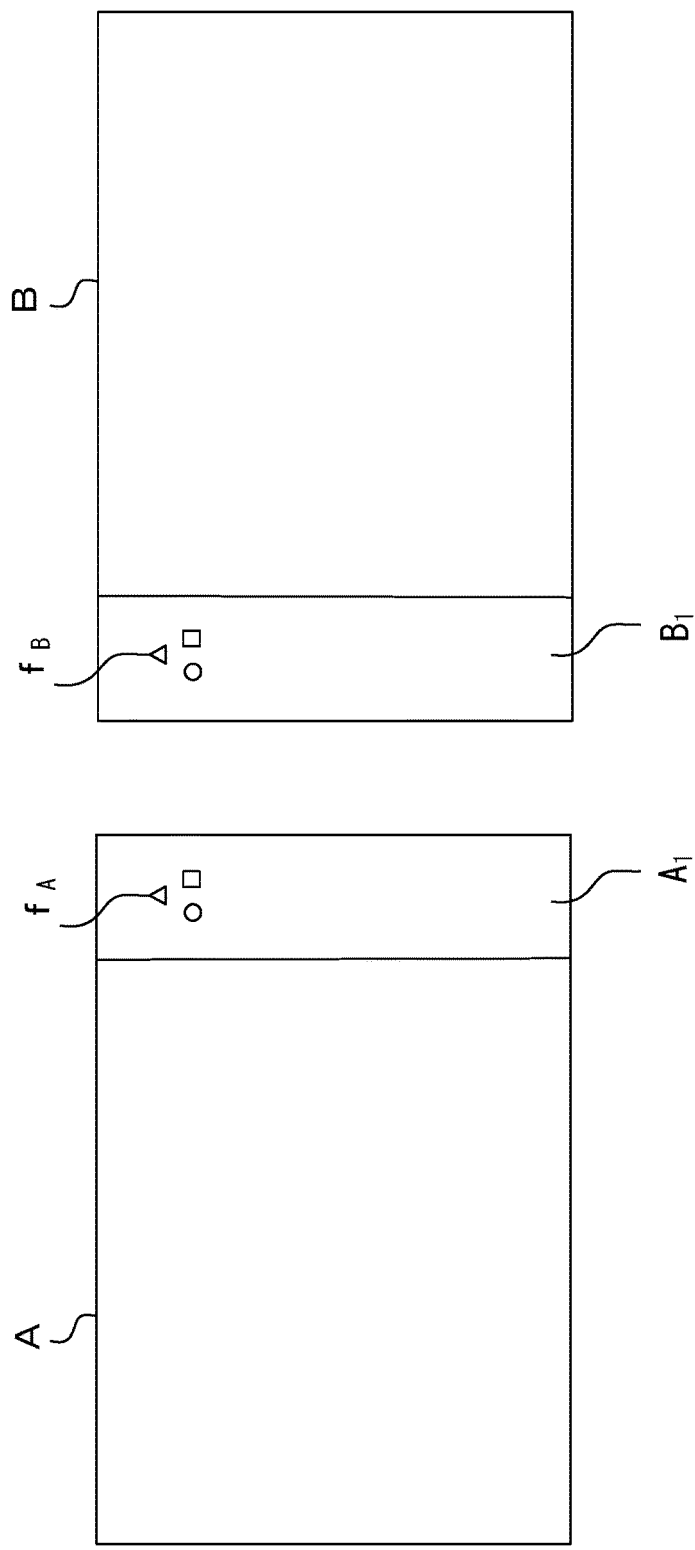
FIG. 4 explains an image pasting method in the XY directions based on a first correction amount.

Next, in step S15, the first correction amount detector 122 detects the first correction amount. FIG. 4 explains a method in which the first correction amount detector 122 detects the first correction amount in the XY directions, which are movement directions of the stage 101. The first correction amount detector 122 detects small areas $f_A$ and $f_B$, which are common characteristic points, from overlapping areas $A_1$ and $B_1$ of two frame images A and B, and thereby detects a distance between small areas $f_A$ and $f_B$ so as to obtain the first correction amount. More specifically, the first correction amount detector 122 detects a distance between small areas $f_A$ and $f_B$ in a case where frame images are virtually arranged on the basis of specified position coordinates corresponding to respective frame images, and thereby obtains the first correction amount.

Figure 5:
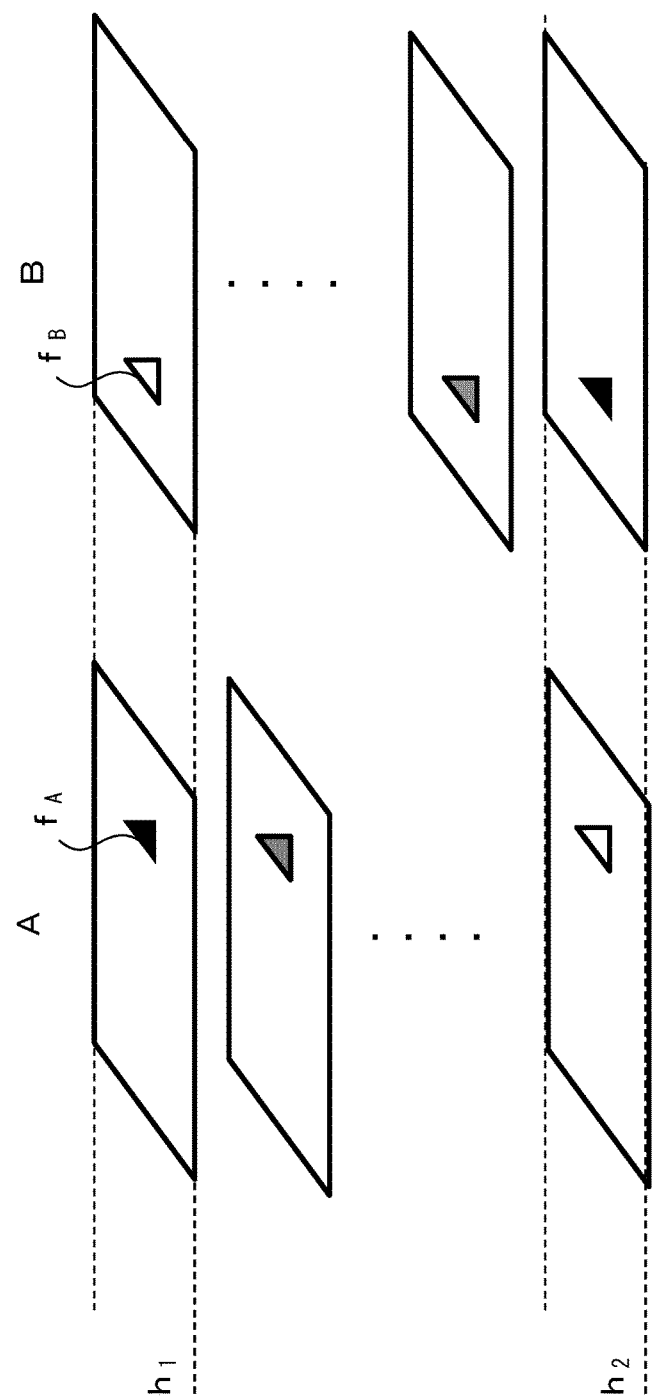
FIG. 5 explains an image pasting method in the Z directions based on, a first correction amount.

FIG. 5 shows a method in which the first correction amount detector 122 detects a first correction amount in the Z directions, which are movement directions of the head portion 112. It is assumed that two frame images A and B, exemplified in FIG. 4, contain position information also in the Z directions and the Z position coordinate at which common characteristic points $f_A$ and $f_B$ are brought into focus the most are $h_1$ and $h_2$ respectively in frame images A and B. Similarly to a case where the first correction amount is detected in the XY directions, the first correction amount detector 122 detects a distance between $h_1$ and $h_2$, and thereby obtains the first correction amount. Note that it is also possible to detect a plurality of corresponding characteristic points instead of detecting one characteristic point for each of the two frame images, and to obtain a correction amount.

In step S16, the decision device for correction amount 124 determines whether or not the first correction amount is equal to or smaller than the prescribed value. When the determination is yes in step S16, the decision device for correction amount 124 selects the first correction amount and the image generator 125 pastes frame images together by using the selected first correction amount (step S17).

When images are to be pasted together, respective frame images are first arranged at specified position coordinates, and a shift amount is corrected by using a calculated correction amount. The image generator 125 performs image pasting of respective frame images at corrected position coordinates.

The so-called template matching is employed as a method of pasting images together by using the first correction amount. In FIG. 4, the image generator 125 corrects a shift amount by moving frame image B so that small areas $f_A$ and $f_B$ match, by using the first correction amount. Note that it is assumed in this example that frame image B is captured after the stage 101 moved in accordance with the instruction value after the capturing of frame image A. In FIG. 5, the image generator 125 moves frame image B in the Z directions so that the Z position coordinate at which small areas $f_A$ and $f_B$ are brought into focus the most, by using the first correction amount, and thereby corrects the shift amount. Note that it is assumed in this example that frame image B is captured after the head portion 112 moved in accordance with the instruction value after the capturing of frame image A. By performing this process on the respective frame images, the shift amount can be corrected for all frame images. The image generator 125 performs image pasting at corrected position coordinates.

When the determination is no in step S16, the decision device for correction amount 124 selects second correction amount, and the image generator 125 corrects the shift amount of each frame image by using the selected second correction amount so as to perform image pasting (step S18). The image pasting is completed through the above procedures.

According to the microscope 1 of the present embodiment, by performing highly accurate position adjustment based on the template matching that uses the first correction amount detected by the first correction amount detector 122 as described above, image pasting can be performed highly accurately. When the first correction amount is greater than the prescribed value that is based on the accuracy of the stage 101 etc., i.e., when it is assumed that the detection of the first correction amount was not performed normally in the first correction amount detector, image pasting is performed by using the second correction amount detected by the second correction amount detector 123. This makes it possible to secure the accuracy of correction performed for image pasting, by a value based on at least the second correction amount.

Note that a situation where a first correction amount is not performed normally is for example a case where a characteristic point is falsely detected when a characteristic point is not found in an overlapping area of frame images or many characteristic points that are close to but different from each other are included. When a characteristic point is falsely detected, frame images are generally pasted in a position that is shifted greatly from the inherent position, however according to the image pasting using the microscope 1 of the present embodiment, image pasting is performed on the basis of at least the second correction amount, which is a value equal to or smaller than the prescribed value. This makes it possible to capture a pasted-together image that is highly reliable even when the template matching failed.

Also, image pasting includes not only pasting together between single frame images but also pasting between a pasted-together image, in which a plurality of frame images are pasted together, and a frame image.

In the present embodiment, the stage 101 and the head portion 112 are electorally powered and move by being controlled by the drive control unit 127, however the stage and the head portion may be moved manually instead of by being electrically powered. In case of manual moving, the user may determine the capturing position of a frame image on the basis of the scales of the XY position detector 110 and the Z position detector 111.

Also, the microscope 1 is provided with the driving controller in the X, Y and Z directions of the sample 102, it can also be provided with a driving controller that turns on the XY plane. For image pasting, the correction amount for the turning direction may be obtained by using the detection method of a correction amount of the present embodiment.

Hereinafter, a variation example of the first embodiment will be explained.

A microscope 2 is different from the microscope 1 in that it is provided with a controller 220 instead of the controller 120. FIG. 6 shows a functional configuration of the controller 220. The controller 220 is similar to the controller 120 except that the controller 220 is not provided with the second correction amount detector 123 and is provided with a decision device for correction amount 224 and an image generator 225 instead of the decision device for correction amount 124 and the image generator 125.

Figure 7:
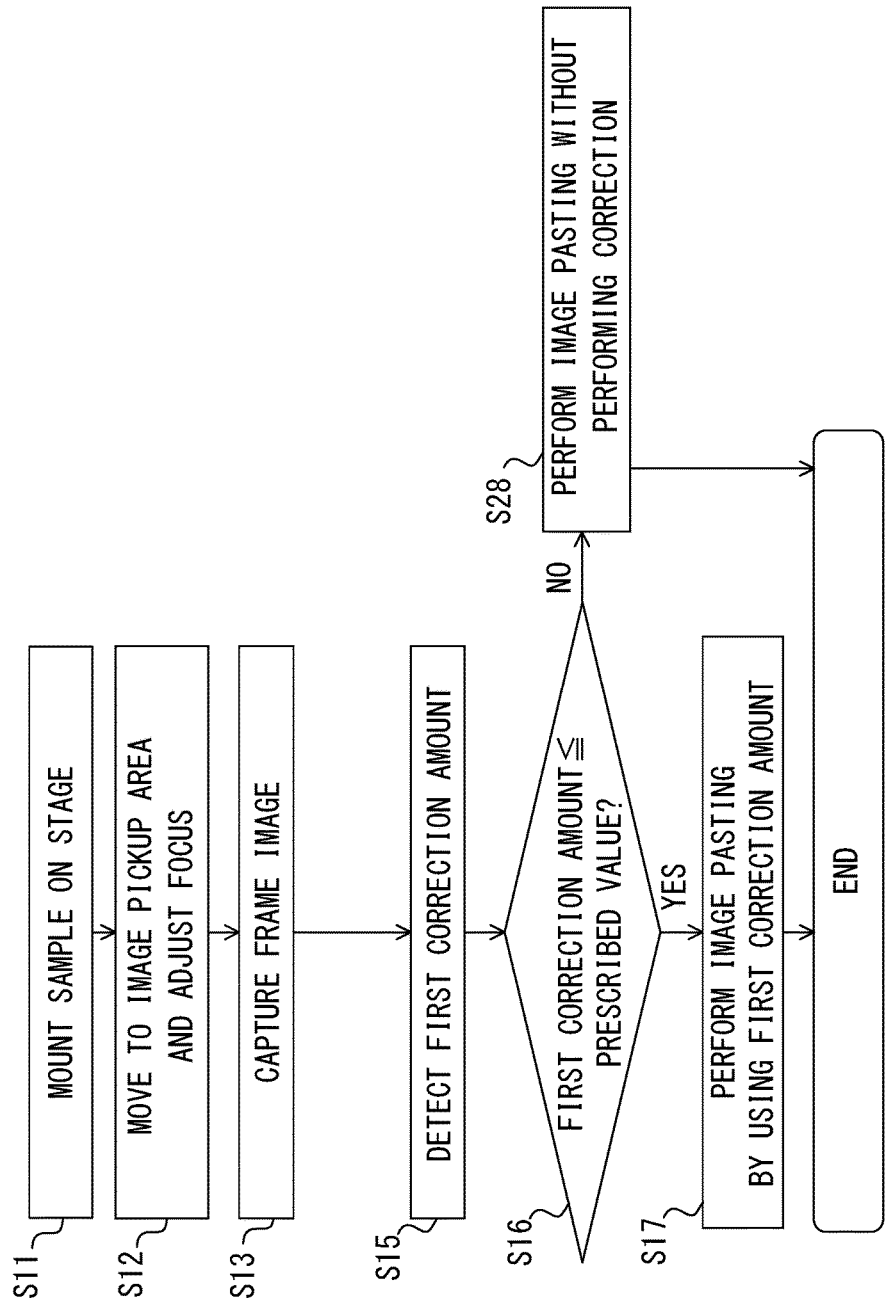
FIG. 7 is a flowchart of image pasting performed by using a microscope 2 according to the variation example of the first embodiment.

By referring to FIG. 7, explanations will be given for the procedures for pasting images together by using the microscope 2 of the above configuration. FIG. 7 is a flowchart explaining the frame image pasting procedures using the microscope 2 according to the present variation example.

Step S11 through step S13 and step S15 through step S17 have procedures that are similar to those explained in the flowchart of FIG. 3, and the explanations thereof will be omitted. In the present example, after a frame image is captured in step S13, the process proceeds to step S15 and the first correction amount is detected.

When the first correction amount is greater than the prescribed value in step S16 (no in the determination), the process proceeds step S28. In step S28, the image generator 225 does not perform correction based on a correction amount, but pastes frame images together. Through the above procedures, the image pasting is completed.

As described above, according to the microscope 2 of the present variation example as well, it is possible to avoid a situation where an image is pasted in a position that is greatly shifted when detection of the first correction amount failed, making it possible to obtain a pasted-together image that is highly reliable.

Note that while the present variation example describes a method in which a pasted-together image is obtained without using a second correction amount detector, a case as another variation example of the first embodiment is also possible that the controller included in a microscope has at least two different second correction amount detectors. In such a case, it is sufficient that when the template matching in the first correction amount detector is not performed normally, correction of frame images is conducted on the basis of an arbitrary one of the second correction amounts that are values equal to or smaller than the prescribed value.

Figure 8:
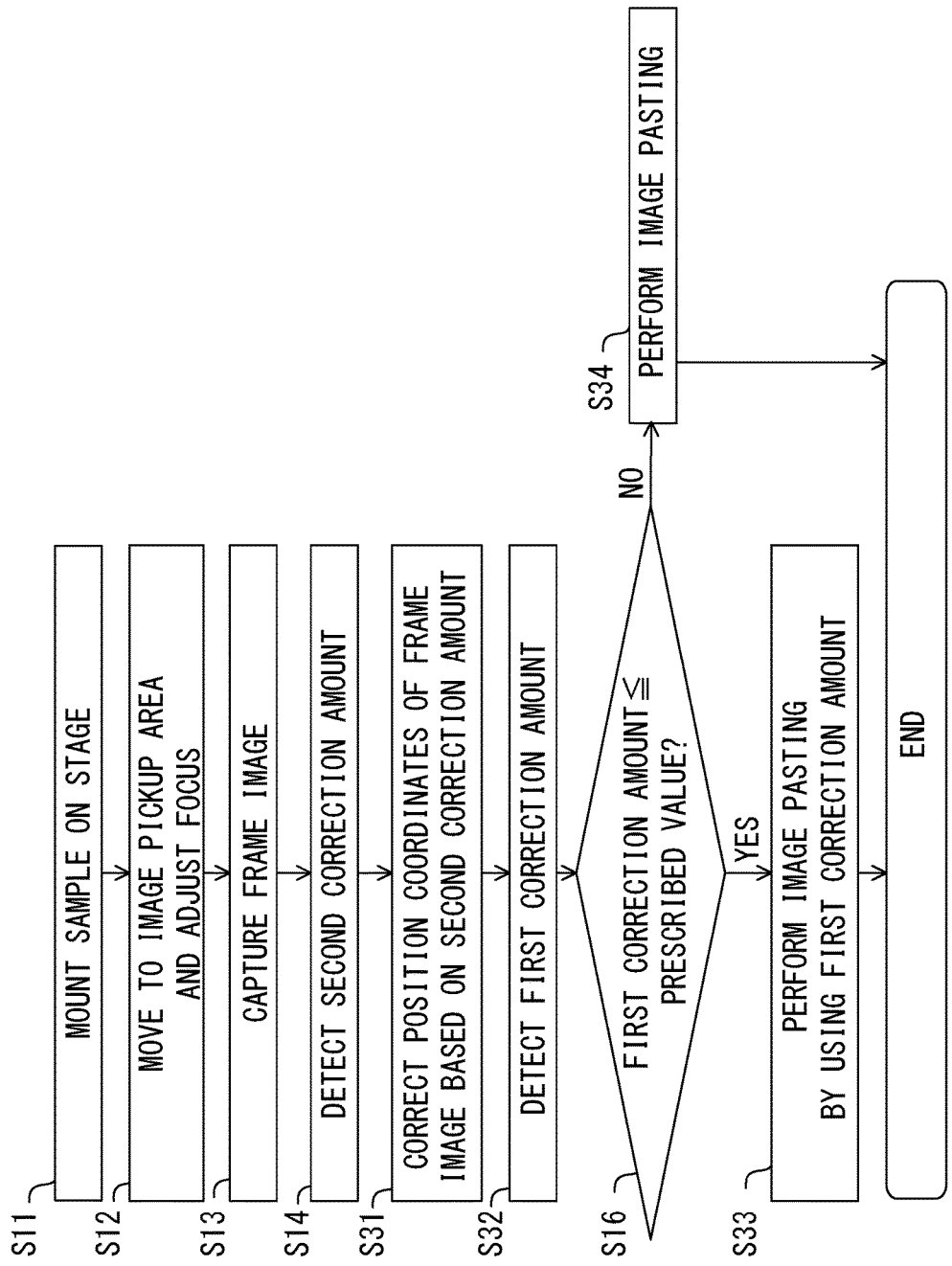
FIG. 8 is a flowchart of image pasting performed by using a microscope 3 according to a second embodiment.

Hereinafter, explanations will be given for the second embodiment of the present invention. FIG. 8 is a flowchart explaining the frame image pasting procedures using a microscope 3 according to the present embodiment. The microscope 3 has a configuration similar to that of the microscope 1, and explanations for the configuration of the microscope 3 will be omitted.

Step S11 through step S14 have procedures that are similar to those explained in the flowchart of FIG. 3, and the explanations thereof will be omitted. After the second correction amount is detected in step S14, the process proceeds step S31.

In step S31, respective frame images are arranged on the basis of the specified position coordinates, the position coordinates of frame images are corrected by using the detected second correction amount. In step S32, the first correction amount for further correcting a positional shift between the position coordinates corrected in step S31 and the specified position coordinates is calculated in a case when the respective frame images having their position coordinates corrected in step S31 are virtually arranged on the basis of specified position coordinates.

Step S16 is similar to the procedure explained in the flowchart of FIG. 3 in the first embodiment. When the determination is yes in step S16, the process proceeds to step S33, and when the determination is no in step S16, the process proceeds to step S34.

Hereinafter, in step S33 or step S34, images are pasted together. In this example, respective frame images having their position coordinates corrected in step S31 are arranged at the specified position coordinates. In step S33, the calculated first correction amount is used so as to correct further the position coordinates of a frame image, and the image generator 125 performs image pasting for the respective frame images. In step S34, image pasting is performed for the respective frame images without changing the position coordinates corrected in step S31. Through the above procedures, the image pasting is completed.

As described above, according to the microscope 3 of the present variation example as well, it is possible to avoid a situation where an image is pasted in a position that is greatly shifted when detection of the first correction amount failed, making it possible to obtain a pasted-together image that is highly reliable.

In the image pasting according to the present embodiment, after the position coordinates of a frame image is corrected on the basis of the second correction amount, a characteristic point is extracted by the first correction amount detector and the first correction amount is detected. Accordingly, compared with a case where correction of position coordinates is not performed on the basis of the second correction amount, the first correction amount is detected with a smaller positional shift between the actual position coordinates and the inherent specified position coordinates of a frame image. This makes it possible to find a corresponding characteristic point at a closer position, making it easier to detect a characteristic point. Also, because a corresponding characteristic point can be found at a closer position, the search scope for detecting a characteristic point can be made narrower than that in the first embodiment, making it possible to reduce the correction amount detection time, and leading to a reduction in time for pasting images.

Hereinafter, explanations will be given for the third embodiment of the present invention. A microscope 4 is similar to the microscope 1 except that the microscope 4 is provided with a controller 320 instead of the controller 120. FIG. 9 shows a configuration of the controller 320, and the controller 320 is provided with an image process unit 128 in addition to those of other controllers.

The image process unit 128 changes a detection condition under which the first correction amount detector 122 detects a characteristic point from an overlapping area of two frame images. A change of a detection condition is for example a change of a matching rate for detecting a characteristic point such as how similar characteristic points are supposed to be to each other in shape in order to be detected as being similar to each other. Also, a change of a search scope, which is a scope in which a characteristic point is detected, is also included in a change of a search condition.

Figure 10:
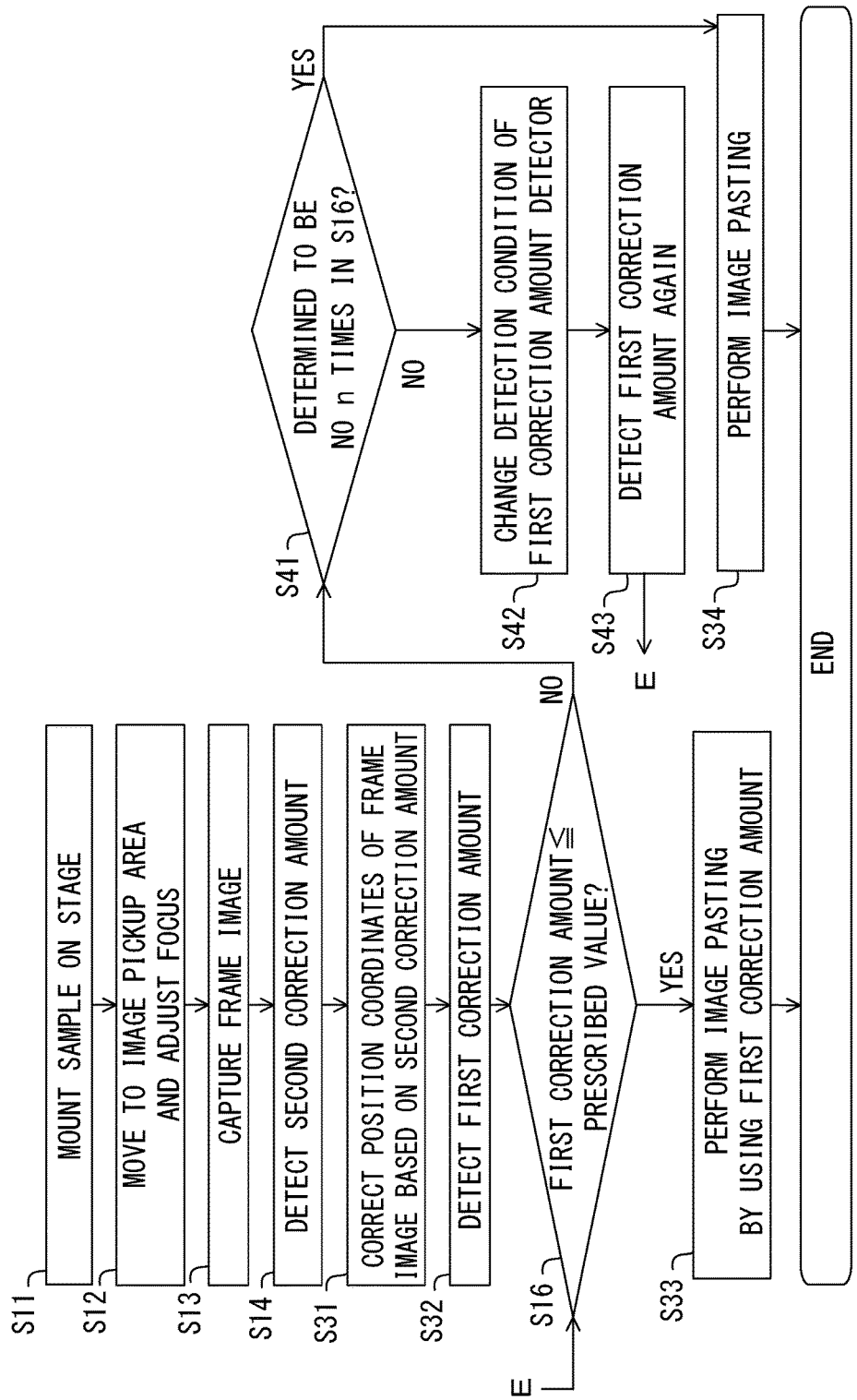
FIG. 10 is a flowchart of image pasting performed by using a microscope 4 according to the third embodiment.

Hereinafter, by referring to FIG. 10, explanations will be given for frame image pasting procedures using a microscope 4 according to the third embodiment. FIG. 10 is a flowchart explaining the frame image pasting procedures using a microscope 4 according to the present embodiment.

Step S11 through step S33 have procedures that are similar to those explained in the flowchart of FIG. 8 of the second embodiment, and the explanations thereof will be omitted.

When the first correction amount is greater than the prescribed value in step S16 (no in the determination), the process proceeds step S41. In step S41, it is determined whether or not determination became No n times in step S16. Note that n is an arbitrary number, and step S41 is provided for avoiding an endless loop between step S16 through step S43, which will be described later.

When the determination is no in step S41, the process proceeds to step S42. In step S42, the image process unit 128 changes a detection condition of the first correction amount detector. Note that explanations will be given on an assumption that a detection condition is a matching rate in this example. Because the success rate of the template matching can be increased by increasing the detection accuracy of characteristic points, it is desired that the image process unit 128 increase the matching rate.

After changing a detection condition in step S42, the first correction amount detector 122 detects the first correction amount again, and the process proceeds to E (step S43). Thereafter, step S16 through step S43 are repeated until the first correction amount becomes equal to or smaller than the prescribed value in step S16 or the determination becomes yes in step S41.

When the determination is yes in step S41, image pasting is performed for the respective frame images without changing the position coordinates corrected in step S31 (step S34). Through the above procedures, pasting of frame images is completed.

As described above, according to the microscope 4 of the present embodiment as well, it is possible to avoid a situation where an image is pasted in a position that is greatly shifted when detection of the first correction amount failed, making it possible to obtain a pasted-together image that is highly reliable. Also, the image pasting according to the present embodiment can detect again the first correction amount after changing a detection condition even when the first correction amount is once determined to be equal to or greater than the prescribed value. This increases possibility that pasted-together image based on the first correction amount will be able to be obtained.

Also, the image process unit 128 may confine the search scope for characteristic points to a scope that is equal to or smaller than the prescribed value.

Figure 11:
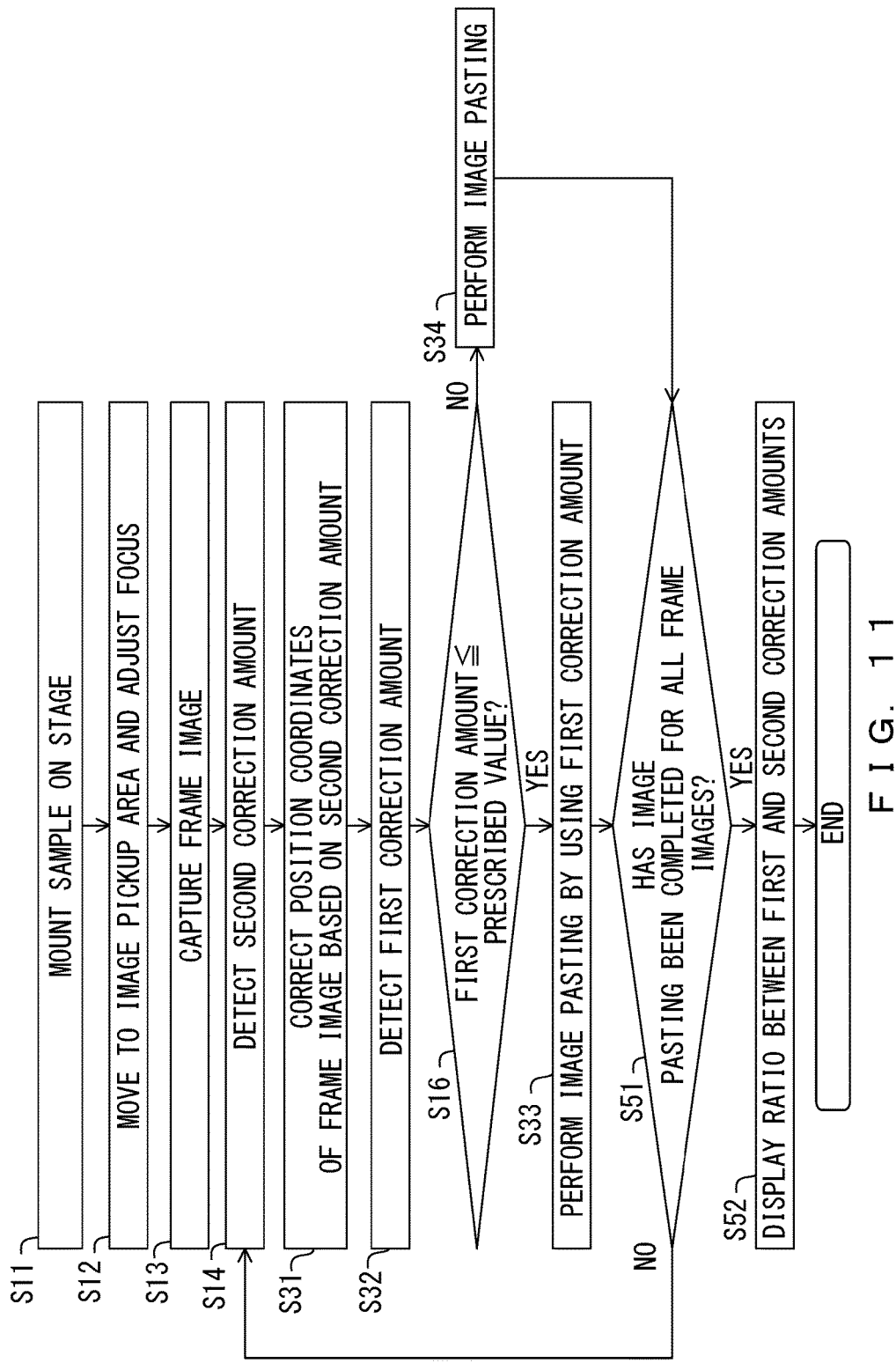
FIG. 11 is a flowchart of image pasting performed by using a microscope 5 according to a fourth embodiment.

Hereinafter, explanations will be given for the fourth embodiment of the present invention. FIG. 11 is a flowchart explaining the frame image pasting procedures using a microscope 5 according to the present embodiment. The microscope 5 has a configuration similar to that of the microscope 1, and explanations for the configuration of the microscope 5 will be omitted.

Step S11 through step S34 have procedures that are similar to those explained in the flowchart of FIG. 8 of the second embodiment, and the explanations thereof will be omitted.

When image pasting is performed in step S33 or step S34, it is determined whether or not image pasting has been completed for all frame images (step S51). When the determination is no in step S51, the process proceeds step S14, and step S14 through step S51 are repeated until image pasting is completed for all frame images.

When the determination is yes in step S51, the process proceeds to step S52. In step S52, the display controller 126 displays, in the image display unit 130, a ratio between the usage frequencies of the first and second correction amounts used for pasting the frame images together. FIG. 12 shows the image display unit 130 in a state that it is displaying the ratio between the usage frequencies of the first and second correction amounts. Area C displays the pasted-together image, and area D displays, a bar graph for the ratio between the usage frequencies of the first and second correction amounts used for pasting images. Means for showing a ratio between the first and second correction amounts is not limited to the above method, and may be for example a circle graph or values. Through the above procedures, pasting of frame images is completed.

As described above, according to the microscope 5 of the present embodiment as well, it is possible to avoid a situation where an image is pasted in a position that is greatly shifted when detection of the first correction amount failed, making it possible to capture a pasted-together image that is highly reliable. Also, the above method makes it possible to recognize the ratio between the usage frequencies of the first and second correction amounts used for pasting frame images, making it possible to check the accuracy in the pasted-together image.

Also, the display controller 126 may input the information of the ratio of the usage frequencies of correction amounts to the obtained pasted-together image so as to store it instead of displaying the ratio of correction amounts in the image display unit 130.

As described above, according to the present invention, it is possible to provide a microscope and an image pasting method that can obtain a pasted-together image that is highly reliable.

The above described first through fourth embodiments are specific examples for facilitating the understanding of the invention, and the present invention is not limited to these embodiments. The microscope permits various modifications and changes without departing from the present invention described in the claims.

What is claimed is:

1. A microscope comprising:
a stage configured to have a sample set thereon;
an image capturing device configured to capture a frame image in an image pickup area of the sample;
a head portion provided with the image capturing device;
a position detector configured to detect position information of the stage and position information of the head portion; and
a hardware processor that is configured to:
change the image pickup area;
detect a first correction amount for pasting frame images together from the captured frame images, the frame images being captured by the image capturing device in a plurality of different image pickup areas;
detect a second correction amount for pasting the frame images together, by using position information corresponding to the frame images;
compare a prescribed value that is set in advance and the first correction amount, and select one of the first correction amount and the second correction amount based on a result of the comparison; and
paste the frame images together based on the selected first correction amount or the selected second correction amount, and thereby assemble the pasted-together image.

2. The microscope according to claim 1, wherein the hardware processor selects the first correction amount when the first correction amount is equal to or smaller than the prescribed value, and selects the second correction amount when the first correction amount is greater than the prescribed value.

3. The microscope according to claim 1,
wherein the hardware processor selects the first correction amount when the first correction amount is equal to or smaller than the prescribed value, and again compares the prescribed value and the first correction amount when the first correction amount is greater than the prescribed value, and
wherein the hardware processor has a plurality of detection conditions for detecting the first correction amount, and the hardware processor again detects the first correction amount by changing the detection condition before again comparing the prescribed value and the first correction amount, when the first correction amount is greater than the prescribed value.

4. The microscope according to claim 1, wherein the hardware processor extracts a characteristic point from the frame images, and detects the first correction amount based on the extracted characteristic point.

5. The microscope according to claim 1, wherein:
the position detector detects position coordinates of the stage, and
in detecting the second correction amount, the hardware processor uses the position information of the stage corresponding to the frame images, and thereby detects the second correction amount for pasting the frame images together.

6. The microscope according to claim 5, the hardware processor is further configured to correct position coordinates of the frame images based on the second correction amount before detecting the first correction amount.

7. The microscope according to claim 5, wherein the prescribed value is a value determined based on movement accuracy of the stage.

8. The microscope according to claim 1, wherein the hardware processor is further configured to output the pasted-together image to a display medium, wherein the hardware processor outputs, to the display medium, a ratio between the first correction amount and the second correction amount used for assembling the pasted-together image.

9. A microscope comprising:
a stage configured to have a sample set thereon;

an image capturing device configured to capture a frame image in an image pickup area of the sample;
a head portion provided with the image capturing device;
a position detector configured to detect position information of the stage and position information of the head portion; and
a hardware processor that is configured to:
  change the image pickup area;
  detect a first correction amount for pasting frame images together from the captured frame images, the frame images being captured by the image capturing device in a plurality of different image pickup areas;
  compare a prescribed value that is set in advance and the first correction amount, and select the first correction amount only when the first correction amount is equal to or smaller than the prescribed value; and
  paste the frame images together based on the first correction amount so as to assemble the pasted-together image when the first correction amount is selected, and
paste the frame images together without performing correction so as to assemble the pasted-together image when the first correction amount is not selected.

10. The microscope according to claim 9, wherein, in detecting the first correction amount, the hardware processor extracts a characteristic point from the frame images, and detects the first correction amount based on the extracted characteristic point.

11. An image pasting method for a microscope including a a stage configured to have a sample set thereon, an image capturing device configured to capture a frame image in an image pickup area of the sample, and a head portion provided with the image capturing device, the image pasting method comprising:
  detecting position information of the stage and position information of the head portion;
  changing the image pickup area;
  capturing frame images in the image pickup area with the image capturing device;
  detecting a first correction amount for pasting frame images together from the frame images captured by the image capturing device, the frame images being captured by the image capturing device in a plurality of different image pickup areas,
  detecting a second correction amount for pasting the frame images together by using position information corresponding to the frame images;
  comparing a prescribed value that is set in advance and the first correction amount, and selecting one of the first correction amount and the second correction amount based on a result of the comparison; and
  pasting the frame images together based on the selected first correction amount or the second correction amount, to thereby assemble the pasted-together image.

* * * * *